United States Patent Office 2,820,770
Patented Jan. 21, 1958

2,820,770
METHOD FOR THE PREPARATION OF POLYAMIDES

Seth R. Adams, Parma, Ohio, assignor to Industrial Rayon Corporation, Cleveland, Ohio, a corporation of Delaware No Drawing. Application December 7, 1954
Serial No. 473,759

10 Claims. (Cl. 260—2.3)

This invention relates to the production of polyamides and to a method for producing such polymers. More particularly, it relates to an improved method for producing polyamides by which waste polymer is recovered and reclaimed and which provides for the production of high quality fibers, filaments, films and the like, hereinafter referred to as fibers.

In the production of polyamide fibers, a certain amount of waste polymer is always produced during the operation of the process. Some of this polymer is removed from the spinning process as waste during the filtration and extrusion steps, and some is set aside as waste during the after-treating operations such as the stretching, washing, crimping, cutting, drying, etc. These portions of polymer and fiber generally are set aside due to difficulties in the spinning process, for example, polymer or fiber which must be set aside during the starting-up or shutting-down of operations.

Various methods previously have been proposed for the recovery and reclamation of such waste polyamides. These previously proposed methods have for one reason or another failed to provide a satisfactory solution to the problems confronted in the recovery and reclamation of waste polyamides. For example, some of the procedures proposed require the depolymerization of the polymer to the monomer before it may be re-used in the system. This, of necessity, requires a number of additional operating steps which require a much greater capital investment in equipment. In addition, some of the methods proposed include the step of melting the polymer which of necessity requires the expenditure of great amounts of heat since the polymer is a poor heat transfer medium. In other methods, the waste polymer is added directly to the polymerization vessel and thus, oxygen and other impurities are incorporated into the polymer being produced. This results in darkening of the polymer and non-uniformity in the final products.

However, by the process of the present invention, polyamides may be prepared by a polymerization method which not only provides for the production of high quality products but also provides for the reclamation and recovery of waste polyamides by a process which requires only a minimum number of recovery steps while at the same time maintaining the polymerization system free from oxygen and other impurities.

In accordance with the present invention a polyamide suitable for melt extrusion may be prepared by a method comprising the steps of heating above about 150° C. a mixture comprising substantially monomeric epsilon-caprolactam and a waste polyamide formed from a polyamide-forming material comprising a compound selected from the group consisting of epsilon-amino caproic acid and epsilon-caprolactam; and incorporating said heated mixture into quantities of monomeric epsilon-caprolactam undergoing polymerization.

The method of the present invention is applicable to the preparation of polyamides which are suitable for melt extrusion, that is, polymers which may be melted and extruded to form various shaped articles such as fibers, filaments, films, and the like. The method of the present invent is particularly applicable to the preparation of polyamides formed from epsilon-caprolactam and derivatives thereof such as dimers and trimers of caprolactam.

As stated above, the waste polyamide employed in the process of the present invention is composed of a polyamide derived from epsilon-amino caproic acid or epsilon-caprolactam. If desired, it may also be derived from mixture of epsilon-amino caproic acid and epsilon-caprolactam either with each other or with small quantities of other polyamide-forming materials, for example, nylon salts such as hexamethylene diammonium adipate, and dimers and trimers, etc., of polyamide-forming monomeric materials. Some of the above, e. g., the nylon salts, under certain conditions may be used as catalysts for initiating the polymerization of caprolactam.

The mixture of the caprolactam monomer and the waste polymer may also contain under certain conditions small quantities of other ingredients providing they do not adversely affect either the process employed or the products formed. For example, certain polyamide solvents, e. g., phenol, etc., may be incorporated into the mixture being heated.

The mixture of the waste polymer and monomer is advantageously heated above about 150° C. for a period of time sufficient to form a homogeneous fluid mixture. By the expression "homogeneous fluid mixture" is meant a uniform, pumpable, flowable or runnable material. With advantage, the polymer-monomer mixture is heated until at least a portion of the waste polyamide is dissolved in the mixture. In determining whether the polyamide is dissolved in the mixture, it is not necessary that the polyamide be in true solution in accordance with the principles of physical chemistry, but rather, it is only necessary that the polymer be dissolved therein to such an extent that the resulting solution may be filtered by the commercial filtering equipment ordinarily employed for spin solutions. Preferably, the heating of the mixture is continued until there is a substantial increase in the viscosity thereof. Thus, a 20% caprolactam polymer solution in monomer will have a viscosity of about six times that of monomeric caprolactam. It is preferred that the viscosity of the polymer-monomer mixture at 170° C. be maintained below about six poises.

A range of heating temperatures above 150° C. may be employed depending upon the form of the polymer-monomer polymerization additive desired and also upon the length of the heating period. The maximum temperature to which the polymer-monomer mixture may be heated is dependent upon the degree of polymerization desired prior to the incorporation of the mixture into the polymerization reaction. For example, where a 20% polymer solution is heated at a temperature of about 180° C. for ten to twenty hours, polymerization takes place in the mixture as indicated by the increase in viscosity as the time of heating is extended. In the case of mixtures containing less than about 15%, no significant polymerization results from heating at the same temperature. Thus, in general, the maximum temperature must be decreased as the concentration of polymer is increased to avoid polymerization in the mixture. In the production of polymer which is to be formed into fibers, it is preferred that the heating temperature be between about 150° and 180° C. However, higher dissolution temperatures may be employed if there is only a relatively short period of high temperature followed by a period of lower temperature. In some instances, it may be preferable to first finely divide the waste polymer, mix it with caprolactam monomer and heat the mixture to lower temperatures, i. e., only above about 80° C., to form a homogeneous fluid, and thereafter to heat the homogeneous mixture to a temperature above about 150° C. to form the polyamide solution.

The heating of the polymer-monomer mixture may, if desired, be performed in an inert atmosphere. For example, carbon dioxide, nitrogen, steam, etc., may be employed as an inert blanket above the surface of the mixture.

The concentration of total polymer is the polymer-monomer mixture to be incorporated into the polymerization system may vary over a wide range depending upon the results desired and the polymerization method being employed. Where it is desired that all of the polymer in the polymerization additive be dissolved in the monomer, then advantageously only up to about 20% by weight of polymer is employed since above such concentrations the viscosity increases to an unworkable level and temperature control becomes more critical. Advantageously, the concentration of polymer dissolved in the monomeric material is maintained between about 5% and 20% by weight and preferably between about 5% and 15% by weight.

If desired, under certain conditions mixtures of polymer and monomer having polymer concentrations above 20% may be heated for short periods of time to effect a partial dissolution thereof and the concentration later adjusted by diluting the mixture with additional quantities of the monomer to further the dissolution. Mixtures having concentrations below about 15% may be stored for substantial periods of time prior to the incorporation of the monomer containing dissolved waste polyamide into the polymerization system without any deleterious effects due to further increases in viscosity from prepolymerization.

In preparing the waste polyamides for use in the process of the present invention, it is desirable that the polymer be clean and of a suitably small size. In the case of blocks of solid polymer, it is desirable to break the larger pieces into smaller ones so as to facilitate the dissolution of the polymer in the monomer. When fibers are being employed as the waste, it is advantageous to cut the fibers into short lengths and to wash the fibers so as to remove any finish or other adulterants which may be present thereon.

Pigment materials may be added to the mixture of the polymer and monomer which is being heated. These pigment materials may be added either to render the resulting filaments opaque or to color the finished fibers. The pigment materials used to make the filaments opaque are known as delusterants. Examples of suitable delusterants are titanium dioxide, zinc sulfide, etc. It appears that under certain conditions dissolved polymer may facilitate the dispersing of pigment uniformly in the polymerization additive.

Prior to incorporating the heated material into the polymerization system, it may be desirable to separate any extraneous impurities from the material. In particular, when producing polymer which is to be employed to form filamentary products, it is generally desirable to filter the material through a commercial filtration apparatus of the type employed in the textile industry and to incorporate into the polymerization system only the filtrate which is free from impurities. In some cases, it may be desirable to heat the polymerization additive briefly just prior to incorporation to a temperature, approaching the polymerization temperature, that is, between about 220° and 260° C.

The invention will be more fully described by the following examples, although it is understood that the invention is not intended to be limited by such examples. In these examples "parts" and "percent" of materials is intended to mean parts and percent by weight.

*Example I*

15 parts of an epsilon-caprolactam polymer fiber which has been washed free of finish and cut into short lengths, is mixed with 85 parts of epsilon-caprolactam monomer. The resulting mixture is heated at a temperature of about 150° C. with agitation for one hour until substantially all of the polymer is dissolved. The resulting 15% solution having a viscosity of about 1.5 poises at 170° C. is thereafter filtered through a commercial spin-solution filtration apparatus to remove any undissolved impurities. The filtrate is then metered into a polymerization vessel containing quantities of epsilon-caprolactam monomer and water as a catalyst. The ratio of the waste polymer incorporated to the total polymer produced is about one to fifteen. The polymerization vessel is maintained at a temperature of about 250° C. From the bottom of the polymerization vessel is removed the molten polycaprolactam which is immediately extruded through spinnerets to form filaments. The extruded filaments are stretched, washed to remove unpolymerized monomer and dried. The finished products are of high quality and are similar to products produced by processes not employing waste polymer.

*Example II*

The procedure of this example is the same as Example I except for the following: The mixture undergoing heating contains 20 parts of polymer and 80 parts of monomer and is heated to a temperature of about 180° C. for about one hour. The temperature of the mixture is then reduced to 150° C. for about two hours until substantially all of the polymer is dissolved. To this solution is added 100 parts of epsilon-caprolactam monomer to form a solution containing only about 10% polymer and this solution is then filtered. Portions of this 10% polymer solution are metered into the polymerization vessel at such a rate as to maintain the ratio of Example I.

The products formed are similar to those of Example I.

*Example III*

The procedure of this example is the same as Example I except for the following: 1% of titanium dioxide is mixed with the waste polymer and the monomer during the heating period to produce a stable homogeneous mixture having the pigment uniformly dispersed therein. The delustered products produced are an opaque white of desirable uniform quality.

The monomeric epsilon-caprolactam undergoing polymerization in accordance with the present invention may be polymerized over a wide range of temperatures between about 220° and 260° C. depending upon the polymerization time desired. The time necessary to produce the desired polymer may be reduced by employing a suitable catalyst in the polymerization mixture. Examples of such suitable catalysts are water, nylon salts such as hexamethylene diammonium, adipate, etc.

The polymers withdrawn from the polymerization vessel can be extruded while still in a molten state and the formed fibers may be subjected to the ordinary processing operations to produce the ultimate products. The formed fibers may be stretched, washed and dried, and if desired, also cut into staple lengths depending upon the ultimate product desired.

The process of the present invention not only provides a method for the production of polyamides which can be formed into high-quality products but also at the same time provides for the recovery and reclamation of waste polyamides. In addition, it is believed that in certain instances the waste polyamides employed in accordance with the method of the present invention facilitate the polymerization and in addition, assist in the dispersion of additional quantities of polymer and pigment materials.

I claim:

1. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; and incorporating said heated mixture into quantities of monomeric epsilon-caprolactam undergoing polymerization.

2. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; heating said mixture until at least a portion of said polyamide is dissolved therein and there is a substantial increase in the vicosity thereof; maintaining the vicosity of said mixture at 170° C. below about six poises; and incorporating said heated mixture into quantities of monomeric epsilon-caprolactam undergoing polymerization.

3. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; separating any unswelled portions of said polyamide from said mixture; and incorporating the remaining mixture from which the unswelled portions have been separated into quantities of monomeric epsilon-caprolactam undergoing polymerization.

4. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; filtering any undissolved portions of said polyamide from said mixture; and incorporating the filtrate into quantities of monomeric epsilon-caprolactam undergoing polymerization.

5. A method for preparing a polyamide suitable for melt extrusion comprising the steps of heating between about 150° and 180° C. a mixture comprising substantially monomeric epsilon-caprolactam, a pigment material and a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; filtering any undissolved portions of said polyamide from said mixture; and incorporating the filtrate into quantities of monomeric epsilon-caprolactam undergoing polymerization.

6. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; separating any unswelled portions of said polyamide from said mixture; re-using the separated unswelled portions of said polyamide in making up additional quantities of said polymer-monomer mixtures; and incorporating the remaining mixture from which the unswelled portions have been separated into quantities of monomeric epsilon-caprolactam undergoing polymerization.

7. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; filtering any undissolved portions of said polyamide from said mixture; heating the filtrate to a temperature between about 220° and 260° C.; and incorporating said filtrate into quantities of monomeric epsilon-caprolactam undergoing polymerization.

8. A method for preparing a polyamide suitable for melt extrusion comprising the steps of heating between about 150° and 180° C. a mixture comprising substantially monomeric epsilon-caprolactam and between about 5% and 20% by weight of a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; and incorporating said heated mixture into quantities of monomeric epsilon-caprolactam undergoing polymerization.

9. A method for preparing a polyamide suitable for melt extrusion comprising the steps of heating between about 150° and 180° C. a mixture comprising substantially monomeric epsilon-caprolactam and between about 5% and 15% by weight of a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; and incorporating said heated mixture into quantities of monomeric epsilon-caprolactam undergoing polymerization.

10. A method for preparing a polyamide suitable for melt extrusion comprising the steps of heating between about 150° and 180° C. a mixture comprising substantially monomeric epsilon-caprolactam and a waste polyamide formed from a polyamide-forming material selected from the group consisting of epsilon-amino caproic acid and epsilon-caprolactam; heating said mixture until at least a portion of said waste polyamide is dissolved therein and there is a substantial increase in the viscosity thereof; maintaining the viscosity of said mixture at 170° C. below about six poises; filtering any undissolved portions of said polyamide from said mixture; adjusting the concentration of polyamide in the filtrate so that it is between about 10% and 15% by weight; storing said filtrate; and thereafter incorporating portions of said filtrate into quantities of monomeric epsilon-caprolactam undergoing polymerization.

References Cited in the file of this patent

UNITED STATES PATENTS

| | | |
|---|---|---|
| 2,343,174 | Edison et al. | Feb. 29, 1944 |
| 2,348,751 | Peterson | May 16, 1944 |

FOREIGN PATENTS

| | | |
|---|---|---|
| 870,484 | France | Dec. 12, 1941 |

U. S. DEPARTMENT OF COMMERCE

PATENT OFFICE

CERTIFICATE OF CORRECTION

Patent No. 2,820,770                                January 21, 1958

Seth R. Adams

It is hereby certified that error appears in the printed specification of the above numbered patent requiring correction and that the said Letters Patent should read as corrected below.

Column 2, line 8, for "mixture" read --mixtures--; column 3, line 62, after the word "temperature" strike out the comma; column 4, line 52, strike out "ples of such suitable catalysts are water, nylon salts"; line 53, after "diammonium" strike out the comma.

Signed and sealed this 11th day of March 1958.

(SEAL)
Attest:
KARL H. AXLINE

Attesting Officer

ROBERT C. WATSON
Commissioner of Patents